United States Patent [19]

Breidenbach

[11] Patent Number: 5,438,964
[45] Date of Patent: Aug. 8, 1995

[54] INTERNAL COMBUSTION ENGINE WITH AN AIR INTAKE SYSTEM

[75] Inventor: Paul Breidenbach, Bechenheim, Germany

[73] Assignee: General Motors Corporation, Detroit, Mich.

[21] Appl. No.: 311,978

[22] Filed: Sep. 26, 1994

[30] Foreign Application Priority Data

Sep. 29, 1993 [DE] Germany .......... 43 33 053.3

[51] Int. Cl.⁶ .............. F02B 27/02; F02D 9/02; F02D 9/16; F02M 35/10
[52] U.S. Cl. .............. 123/184.55; 123/184.56; 123/190.12
[58] Field of Search ............ 123/184.53, 184.55, 123/184.56, 184.57, 184.58, 184.59, 190.1, 190.2, 190.4, 190.6, 190.8, 190.12

[56] References Cited

U.S. PATENT DOCUMENTS

| | | | |
|---|---|---|---|
| 4,664,076 | 5/1987 | Miyano et al. | 123/184.55 |
| 4,679,531 | 7/1987 | Hitomi et al. | 123/184.55 |
| 4,765,286 | 8/1988 | Lyjak et al. | 123/184.55 |
| 4,834,038 | 5/1989 | Montagni | 123/190.8 |
| 4,932,369 | 6/1990 | Parr | 123/184.55 |
| 5,048,469 | 9/1991 | Spray | 123/184.55 |
| 5,105,784 | 4/1992 | Davis et al. | 123/190.2 |
| 5,156,117 | 10/1992 | Muller et al. | 123/184.55 |

FOREIGN PATENT DOCUMENTS

| | | |
|---|---|---|
| 957802 | of 0000 | Germany . |
| 3825000 | 2/1989 | Germany . |
| 4028489 | 12/1992 | Germany . |

*Primary Examiner*—Marguerite Macy
*Attorney, Agent, or Firm*—Karl F. Barr, Jr.

[57] ABSTRACT

An internal combustion engine with an air intake system for transmitting combustion air to at least one cylinder chamber is involved which consists of one or more intake pipes (1-4) coiled more than 180° and of means for controlled variation of the effective intake pipe length as well as at least one throttle mechanism whose movement can be controlled, where the means for varying the intake pipe length and the throttle mechanism for controlling the air volume are combined structurally in a substantially cylindrical, rotary slide valve (17) which can be rotated in a controlled manner about a cylinder axis (18) and also in a controlled manner can be moved to a limited degree in the direction of the cylinder axis (18).

7 Claims, 5 Drawing Sheets

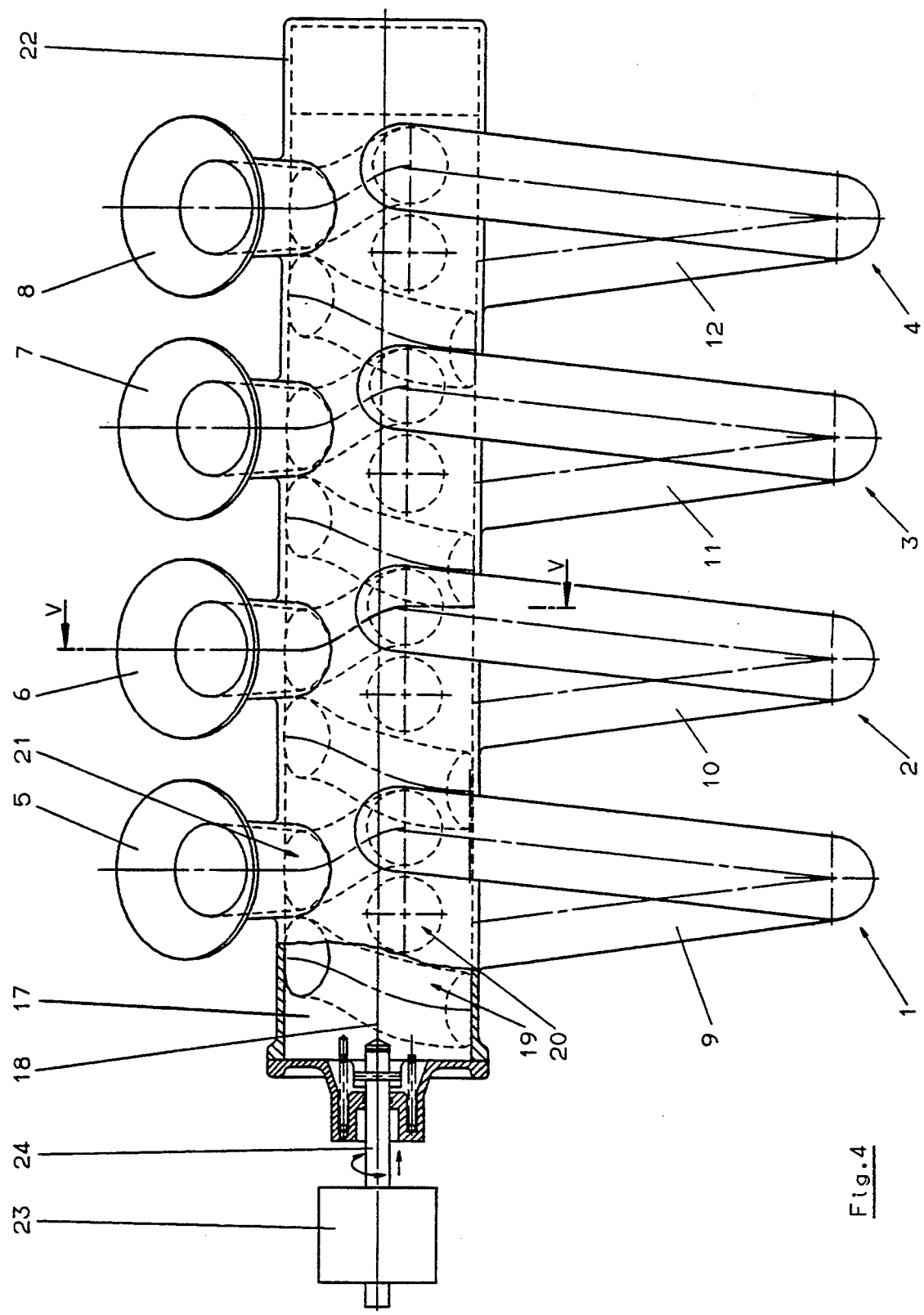

INTERNAL COMBUSTION ENGINE WITH AN AIR INTAKE SYSTEM

TECHNICAL FIELD

In the air intake system of the internal combustion engine according to the invention, means for changing the effective intake pipe length and a throttle mechanism for controlling the air volume are combined in a control element, especially a cylindrical rotary slide valve.

BACKGROUND

It has been found that air vibrations in the air intake system of internal combustion engines can be utilized to exert a positive influence on the charging of the combustion chambers with combustion air. Every rotation speed of the motor is assigned a certain optimal intake pipe configuration at full load in order to achieve the maximal gas dynamic additional charging effect. The internal combustion engine can generate a high torque if long and thin intake pipes are gas dynamically active in the lower rpm range but short intake pipes with a larger inner diameter are used in the upper rpm range.

As seen in German Patent DE 36 08 310 Al, a device is known for the continuous variation of the length of an air intake manifold. The air intake pipes are coiled 360° around a collecting intake pipe. The collecting intake pipe is formed by a hollow cylindrical rotating body which forms an inner wall for the intake pipe surrounding it and is provided with one opening to each inner chamber of the intake pipe. Air is drawn through the intake pipes, the openings and the collecting intake pipe in the direction of the combustion chambers. By rotating the rotating body with the openings a variable intake pipe length can be obtained. A control of the quantity of air can be achieved via a throttle valve located in the collecting intake pipe. Strong air turbulence occurs in the region of the throttle valve and the openings of the collecting intake pipe, impairing the efficiency of the process. It is extremely problematic and costly to seal the collecting intake pipe against the individual intake pipes.

A comparable design can be recognized in the air intake system shown in German Patent DE 37 14 953 Al. The outer radius of the intake pipes which here also are wound around a collecting intake pipe decreases with increasing length of the flow path through the intake pipe. As a result gas dynamic effects are positively influenced in the sense described above. Here also, however, an additional throttle mechanism is necessary, contributing to turbulence of the intake air and high cost in sealing of the system.

SUMMARY OF THE INVENTION

The invention has the objective of devising a relatively simple air intake system for an internal combustion engine which makes optimal gas charging with high efficiency possible by utilizing gas dynamic processes.

In the air intake system of the internal combustion engine according to the invention, means for changing the effective intake pipe length and a throttle mechanism for controlling the air volume are combined in a control element, especially a cylindrical rotary slide valve. The cylindrical rotary slide valve is formed in a substantially cylindrical shape and is mounted with the capability of positively controlled rotation about a cylinder axis and also with positively controlled movement in the direction of the cylinder axis in the air intake system. One degree of freedom of the cylindrical rotary slide valve controls the length of the intake pipe, the second degree of freedom is used to regulate the air volume.

In the known air intake systems in which, as described above, the intake pipe length variation is accomplished by rotating a hollow cylindrical rotating body, a throttle valve can be omitted if the rotating body is also capable of axial displacement. With this approach, the cross section of the openings between the rotating body and the intake pipes is variable and the throttling can therefore be accomplished by moving the rotating body independently of the set intake pipe length. However, the problems mentioned above with respect to the sealing of the system still persist.

A favorable arrangement of a cylindrical rotary slide valve is to position this valve approximately perpendicular to the planes defined by the intake pipe coils but without forming an inner wall of the intake pipe but rather cutting said intake pipe in the region where the coils cross. By changing the position of the cylindrical rotary slide valve one can select whether the combustion air will be sucked in through the coil (long path) or by bridging the coil (short path). This two-step variation of the intake pipe length can be achieved by axial displacement or by rotation of the cylindrical slide valve. The remaining degree of freedom of the cylindrical rotary slide valve is used in each case for throttling the engine.

Independently of the type of internal combustion engine it is possible to control the entire air intake system via only one cylindrical rotary slide valve, which is also true for V-block engines.

The position of the cylindrical rotary slide valve can be controlled by known adjusting means as a function of preassigned nominal values (e.g., gas pedal position) and also automatically as a function of the operating characteristics of the internal combustion engine.

A detailed description of the invention is presented on the basis of examples of its embodiment.

BRIEF DRAWING DESCRIPTION

FIG. 4 is a side view of the air intake system in FIG. 1 with the setting of a short intake pipe length;

DETAILED DESCRIPTION

Figure 1:
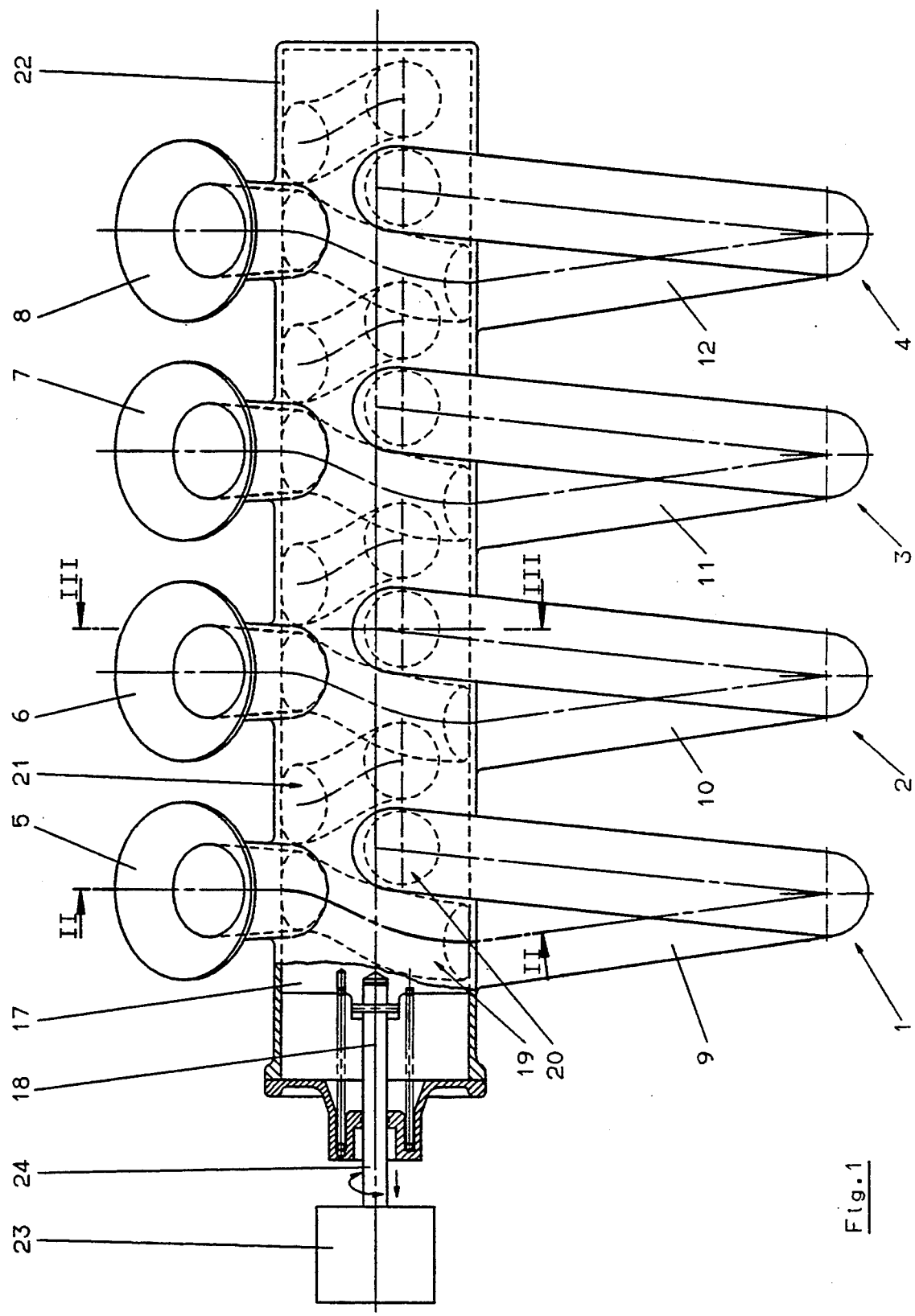
FIG. 1 is a side view of an air intake system of a four-cylinder internal combustion engine in the case of the setting of a large intake pipe length but omitting all other details of the internal combustion engine.
Figure 2:
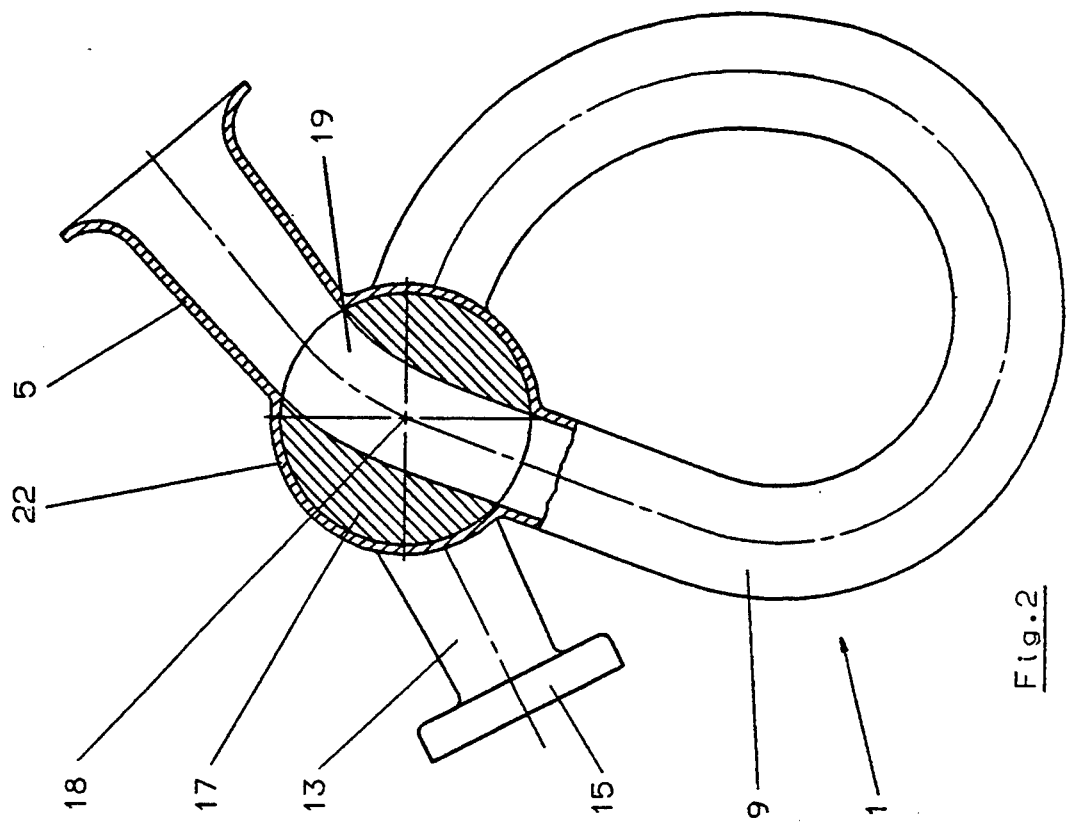
FIG. 2 shows section 2—2 from FIG. 1.
Figure 3:
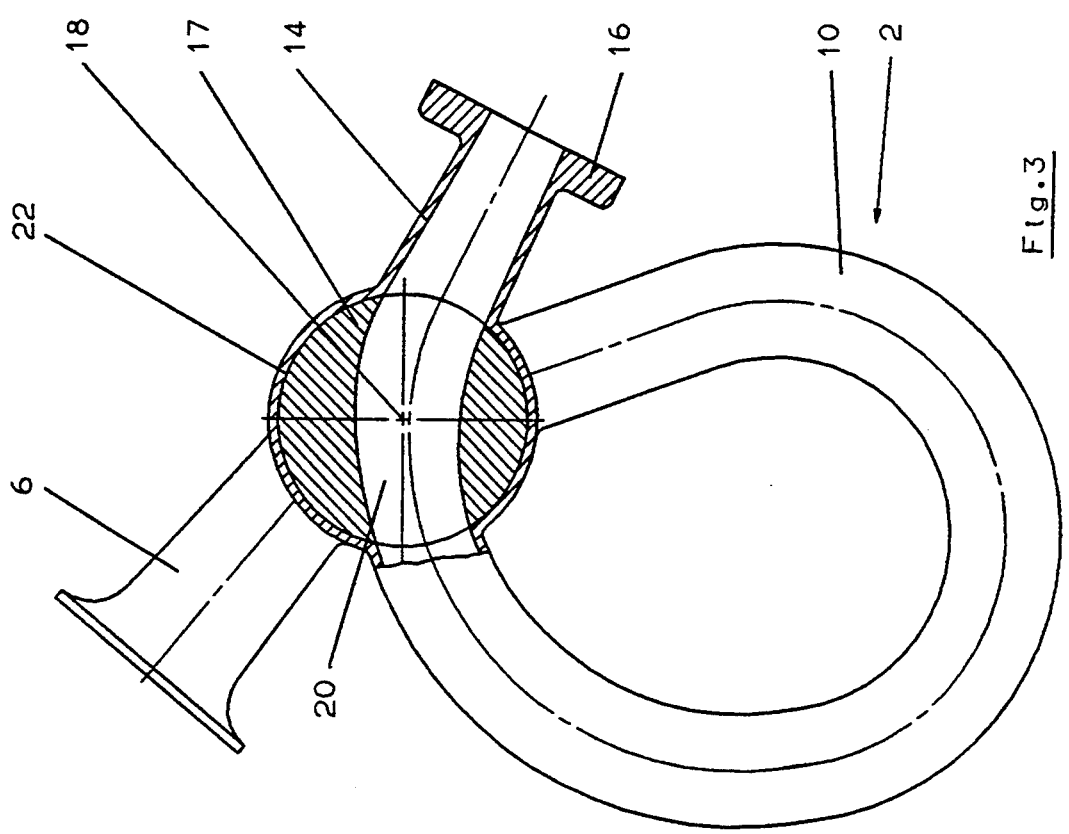
FIG. 3 shows section 3—3 from FIG. 1.

In FIG. 1, an air intake system of a four-cylinder internal combustion engine with four intake pipes 1 through 4 coiled around 360° is shown. The intake pipes 1 through 4 in each case have a short intake fitting 5 through 8 (all of which may be connected to an intake plenum, not shown), one coil loop 9 through 12, and an end piece 13,14 which is concealed in FIG. 1 but is shown in FIGS. 2 and 3. The end pieces 13,14 are connected by flanges 15,16 to the engine block and lead to air inlet passages in the cylinder head of the internal combustion engine. The intake pipes 1 through 4 are coiled in a close helical pattern.

Figure 5:
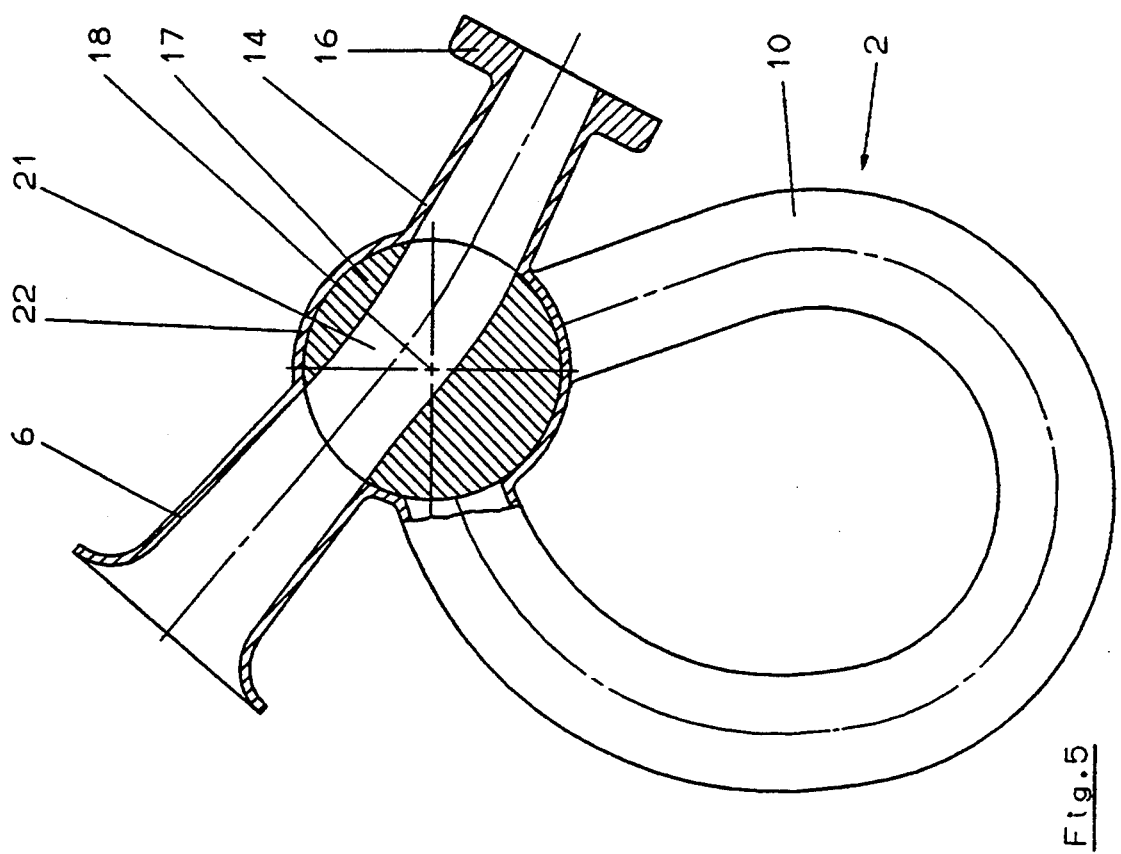
FIG. 5 shows section 5—5 from FIG. 4.

A cylindrical rotary slide valve 17 is mounted approximately perpendicular to the planes formed by the coils 9 through 12 of the intake pipes 1 through 4 in such a way that it cuts the intake pipes 1 through 4 in the region where their coils 9 through 12 cross, see FIGS. 2 and 3. The positioning here is such that the cylindrical rotary slide valve 17 is capable of positively limited rotation about a cylinder axis 18 and is capable of limited displacement in the direction of the cylinder axis. The cylindrical rotary slide valve 17 has cross-channels 19,20,21, which, in each case, are assigned to a corresponding intake pipe 1 through 4. Depending on the axial set position of the cylindrical rotary slide valve 17, either the cross-channels 19 and 20 complete the coils 9 through 12 of the intake pipes 1 through 4, as illustrated in FIGS. 2 and 3, or the coils 9 through 12 are bridged by the cross-channel 21, the latter being illustrated in FIGS. 4 through 6. The two positions of the cylindrical rotary slide valve 17 are set by an axial displacement relative to the intake pipes 1 through 4. If the cylindrical rotary slide valve 17 is in the outermost right position, as viewed in FIGS. 1 through 3, combustion air can flow from the intake fittings 5 through 8 through the cross-channels 19, the coils 9 through 12 and the cross-channels 20 to the end pieces 13,14. In such instance, a large intake pipe length is gas-dynamically active. If the cylindrical rotary slide valve 17 is moved to the extreme left position, as viewed in FIGS. 4 through 6, the intake air flows directly from the intake fittings 5 through 6 through the cross-channel 21 to the end pieces 13,14 resulting in short intake pipes being gas dynamically active.

Figure 6:
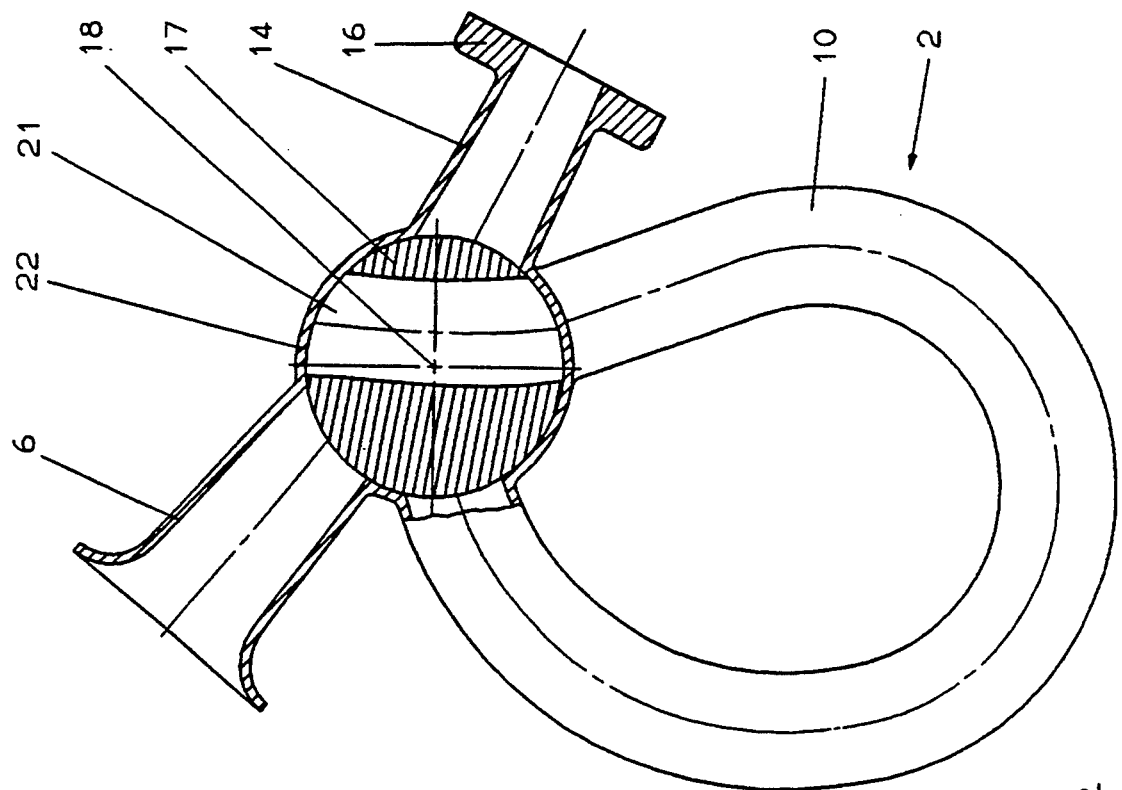
FIG. 6 is a view as in FIG. 5 with the internal combustion engine completely throttled.

In addition, the cross section of the intake pipes 1 through 4 is variable by rotating the cylindrical rotary slide valve 17 about its cylinder axis 18 which changes the position of the cross-channels 19 and 21 relative to the intake fittings 5 through 8 and the position of the cross-channels 20 and 21 relative to the end pieces 13,14. Consequently, by rotating the cylindrical rotary slide valve 17 the intake pipe cross section is adjustable from a minimum flow condition such as is illustrated in FIG. 6, to a maximum flow condition, as in FIG. 5.

The exact position of the cylindrical rotary slide valve 17 is selectable in advance by controller 23. Through the controller 23, which acts on shaft 24 of the rotary slide valve 17, the rotary slide valve 17 is automatically moved axially as a function of the momentary operating characteristics of the internal combustion engine. In addition the cylindrical rotary slide valve 17 can be rotated as a function of, for instance, an externally applied input such as the position of an accelerator pedal. For example, a cable pull between the accelerator pedal and the shaft 24 may be provided to mechanically rotate the cylindrical rotary slide valve 17.

Therefore, means for two-step variation of the length of the intake pipe and for controlling the air volume can be structurally combined in the rotary slide valve 17. The air is supplied to the internal combustion engine under optimal conditions with very good efficiency.

The system described can also be used in systems having the intake air collected axially through the cylindrical rotary slide valve, the latter acting as an air collecting duct. If the cylindrical rotary slide valve is arranged centrally in the coil loops of the intake pipe such that it defines an inner wall of the coils, rotation of the rotary slide valve will be operable to continuously vary the length of the intake pipe. At the same time, however, the internal combustion engine can be throttled by axially displacing the cylindrical rotary slide valve.

Figure 8:
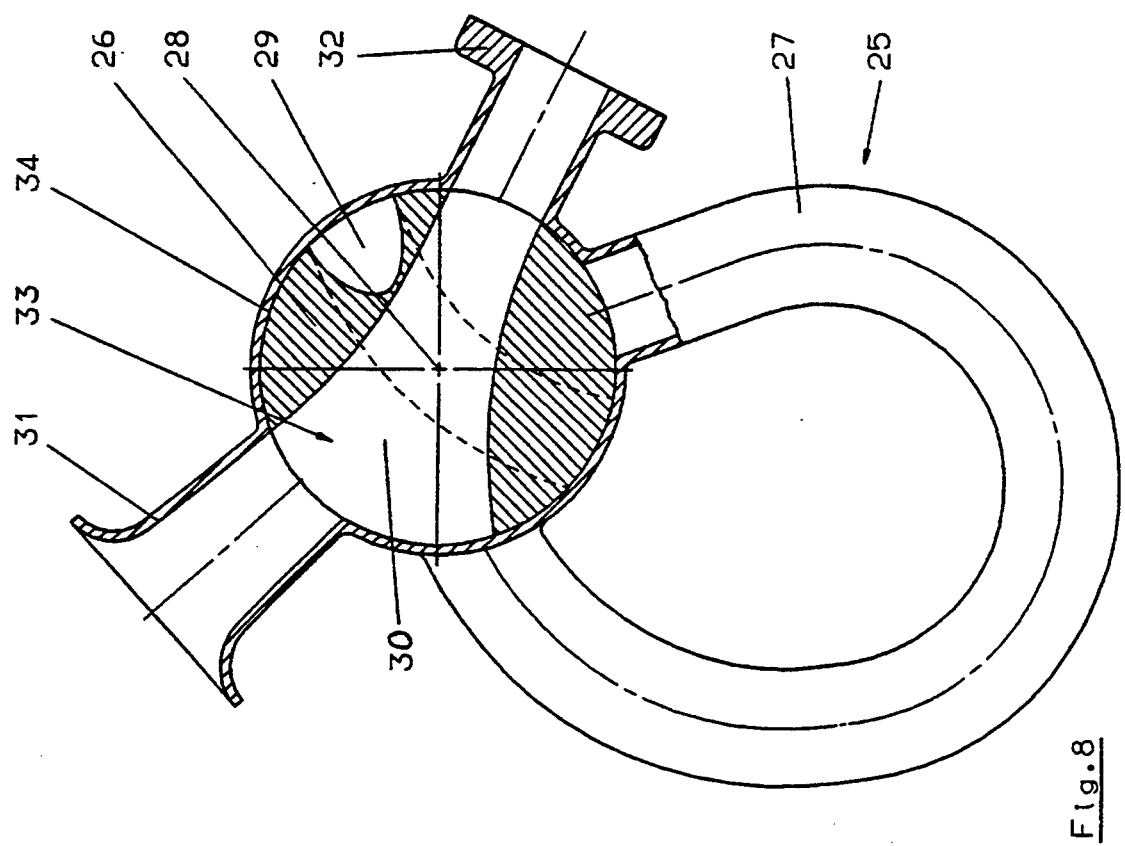
FIG. 8 is a view as in FIG. 7 with a setting of a short intake pipe length.
Figure 7:
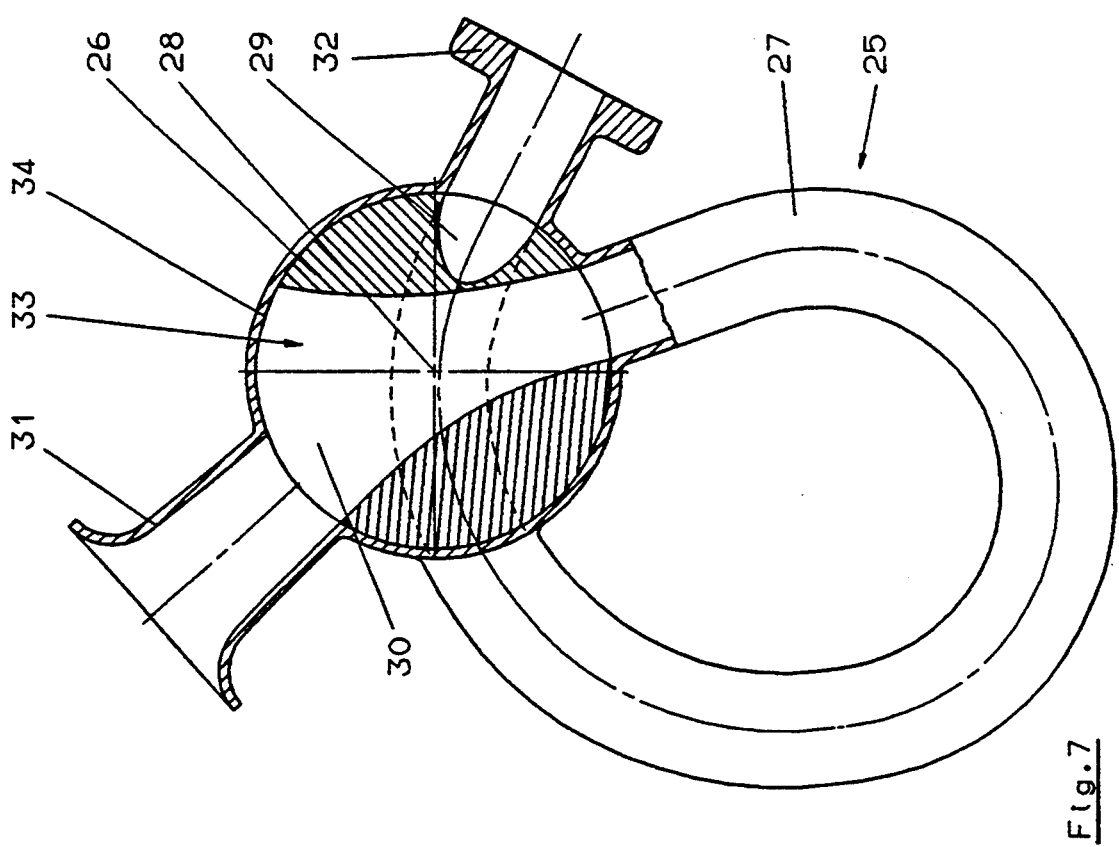
FIG. 7 is a section through an air intake system of a difference design with the setting of a large intake pipe length.

Another embodiment of the invention is shown schematically in FIGS. 7 and 8. Here an intake pipe 25 is shown where, as in the first example, a cylindrical rotary slide valve 26 is arranged in the crossing region of a coil loop 27 of the intake pipe 25. A cylinder axis 28 is approximately perpendicular to the plane formed by the coil 27. The cylindrical rotary slide valve 26 has two cross-channels 29,30 for each intake pipe 25, with cross-channel 30 being branched or expanded at 33. In the position of the cylindrical rotary slide valve 26 shown in FIG. 7, the coil 27 is positioned between an intake fitting 31 and an end piece 32 of the intake pipe 25 to define a large active intake pipe length for operation in lower rpm range. If the cylindrical rotary slide valve 26 is moved from the position shown in FIG. 7 counter-clockwise to the position shown in FIG. 8, the branch 33 of cross-channel 330 communicates with the intake fitting 31 such that the coil loop 27 is bridged by the cross-channel 30 to present a short intake pipe length for activity at upper rpm ranges. At the same time the cross-channel 29 is closed by rotary slide valve housing 34. The intake pipe length in this example of the invention is therefore adjusted by rotating the cylindrical rotary slide valve 26 around its cylinder axis 28. The internal combustion engine is throttled by moving the cylindrical rotary slide valve 26 axially, thereby changing the effective cross section of the cross-channels 29,30. The adjusting means for this may be of a similar design to that described above. Here also, on the whole, very good flow relationships exist and the air intake system is sealed in a structurally simple manner.

While the invention has been described by reference to certain specific embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. An intake system for an internal combustion engine comprising an intake pipe having an intake fitting, a coil loop and an end piece, said coil loop having a radius such that said intake fitting and said end piece cross, said intake system further comprising a cylindrical rotary slide valve perpendicular to the plane of said coil loop and disposed in said intake pipe at said location at which said intake fitting and said end piece cross, said cylindrical rotary slide valve operable to vary the length of said intake pipe and to vary the cross section of said intake pipe through axial displacement and through rotation of said valve.

2. An intake system for an internal combustion engine comprising an intake pipe having an intake fitting, a coil loop and an end piece, said coil loop having a radius such that said intake fitting and said end piece cross, said intake system further comprising a cylindrical rotary slide valve disposed in said intake pipe at said location at which said intake fitting and said end piece cross, said cylindrical rotary slide valve operable to vary the length of said intake pipe through axial displacement of said valve and to vary the cross section of said intake pipe through rotation of said valve to thereby throttle air volume through said intake.

3. An intake system for an internal combustion engine, as defined in claim 2, said cylindrical rotary slide valve comprising a first channel operable to connect said intake fitting and said end piece through said coil loop when said valve is in a first axial position and a second channel operable to connect said intake fitting directly to said end piece when said valve is in a second axial position.

4. An intake system for an internal combustion engine, as defined in claim 2, said cylindrical rotary slide valve disposed in said intake pipe such that the axis of said valve extends perpendicular to the plane of said coil loop.

5. An intake system for an internal combustion engine comprising an intake pipe having an intake fitting, a coil loop and an end piece, said coil loop having a radius such that said intake fitting and said end piece cross, said intake system further comprising a cylindrical rotary slide valve disposed in said intake pipe at said location at which said intake fitting and said end piece cross, said cylindrical rotary slide valve operable to vary the length of said intake pipe through rotation of said valve and to vary the cross section of said intake pipe, to thereby throttle air volume through said intake, through axial displacement of said valve.

6. An intake system for an internal combustion engine, as defined in claim 5, said cylindrical rotary slide valve comprising a first channel operable to connect said intake fitting and said end piece through said coil loop when said valve is rotated to a first position and a second channel operable to connect said intake fitting directly to said end piece when said valve is rotated to a second position.

7. An intake system for an internal combustion engine, as defined in claim 5, said cylindrical rotary slide valve disposed in said intake pipe such that the axis of said valve extends perpendicular to the plane of said coil loop.

* * * * *